(12) United States Patent
Gassoway

(10) Patent No.: US 7,895,344 B2
(45) Date of Patent: Feb. 22, 2011

(54) METHOD AND APPARATUS FOR REMOTE MANAGEMENT

(75) Inventor: Paul Gassoway, Norwood, MA (US)

(73) Assignee: Computer Associates Think, Inc., islandia, NY (US)

( * ) Notice: Subject to any disclaimer, the term of this patent is extended or adjusted under 35 U.S.C. 154(b) by 1122 days.

(21) Appl. No.: 11/132,606

(22) Filed: May 18, 2005

(65) Prior Publication Data

US 2006/0029036 A1 Feb. 9, 2006

Related U.S. Application Data

(60) Provisional application No. 60/573,592, filed on May 21, 2004.

(51) Int. Cl.
*G06F 15/16* (2006.01)
(52) U.S. Cl. ............... 709/230; 709/223; 709/227
(58) Field of Classification Search ........... 709/217, 709/218, 225, 227, 223, 230; 714/38, 57
See application file for complete search history.

(56) References Cited

U.S. PATENT DOCUMENTS

| | | | | |
|---|---|---|---|---|
| 5,419,800 A | * | 5/1995 | Moody | 156/502 |
| 5,511,197 A | * | 4/1996 | Hill et al. | 719/328 |
| 5,515,508 A | * | 5/1996 | Pettus et al. | 709/203 |
| 5,586,117 A | * | 12/1996 | Edem et al. | 370/466 |
| 5,701,415 A | * | 12/1997 | Wei | 719/328 |
| 5,724,588 A | * | 3/1998 | Hill et al. | 719/328 |
| 5,826,027 A | * | 10/1998 | Pedersen et al. | 709/221 |
| 5,887,172 A | * | 3/1999 | Vasudevan et al. | 719/328 |
| 6,038,593 A | * | 3/2000 | Huckins | 709/217 |
| 6,249,822 B1 | * | 6/2001 | Kays et al. | 719/330 |
| 6,347,342 B1 | * | 2/2002 | Marcos et al. | 719/315 |
| 6,408,342 B1 | * | 6/2002 | Moore et al. | 719/330 |
| 6,437,803 B1 | * | 8/2002 | Panasyuk et al. | 715/733 |
| 6,445,716 B1 | * | 9/2002 | Favichia et al. | 370/466 |
| 6,456,234 B1 | * | 9/2002 | Johnson | 342/357.09 |
| 6,539,479 B1 | * | 3/2003 | Wu | 713/151 |
| 6,931,530 B2 | * | 8/2005 | Pham et al. | 713/165 |
| 7,054,332 B2 | * | 5/2006 | Favichia et al. | 370/466 |
| 7,165,097 B1 | * | 1/2007 | Mackin et al. | 709/218 |
| 7,383,433 B2 | * | 6/2008 | Yeager et al. | 713/157 |
| 7,437,548 B1 | * | 10/2008 | Alfieri | 713/150 |
| 2002/0156893 A1 | * | 10/2002 | Pouyoul et al. | 709/225 |
| 2002/0184357 A1 | * | 12/2002 | Traversat et al. | 709/223 |

(Continued)

OTHER PUBLICATIONS

CDE 1.1: Remote Procedure call. copyright 1997 Open group can be retrieved at the URL below: http://www.opengroup.org/onlinepubs/9629399/chap12.htm.*

(Continued)

*Primary Examiner*—Ario Etienne
*Assistant Examiner*—Sargon N Nano
(74) *Attorney, Agent, or Firm*—Leffert Jay & Polglaze, P.A.

(57) ABSTRACT

A method for remote management communication is provided. A bind message including a new protocol identifier is sent from a source node to a destination node. A response message is received by the source node from the destination node. The source node sends one or more additional messages to the destination node, using a protocol corresponding to the new protocol identifier, if the response message from the destination node is an acknowledgement message.

21 Claims, 7 Drawing Sheets

U.S. PATENT DOCUMENTS

| | | | |
|---|---|---|---|
| 2003/0041141 A1* | 2/2003 | Abdelaziz et al. | 709/223 |
| 2003/0140180 A1* | 7/2003 | Brown et al. | 709/330 |
| 2003/0182421 A1* | 9/2003 | Faybishenko et al. | 709/224 |
| 2004/0030794 A1* | 2/2004 | Hugly et al. | 709/230 |
| 2005/0071857 A1* | 3/2005 | Wang et al. | 719/330 |
| 2007/0174428 A1* | 7/2007 | Lev Ran et al. | 709/218 |
| 2009/0031006 A1* | 1/2009 | Johnson | 709/218 |

OTHER PUBLICATIONS

PCT Invitation to Pay Additional Fees for PCT/US2005/017448, 5 pages, Aug. 24, 2005.

Partial International Search Report for PCT/US2005/017448, 3 pages Aug. 24, 2005.

CE 1.1: Remote Procedure Call—RPC PDU Encodings; PC PDU Encodings XP-002339832; 22 pages, 1997.

GSS-API Security for ONC RPC; Barry Jaspan, Open Vision Technologies, Inc., Cambridge, MA 02142; pp. 144 to 151, 1995.

CAT Working Group; Internet Draft; The Secure Remote Password GSS-API Mechanism (SRPGM); K.R. Burdis, Rhodes University; 23 pages, Jan. 2000.

Notification of Transmittal of the International Search Report for Application No. PCT/US2005/017448; 9 pages, Oct. 11, 2005.

Written Opinion of the International Searching Authority for Application No. PCT/US2005/017448, 11 pages, Oct. 11, 2005.

* cited by examiner

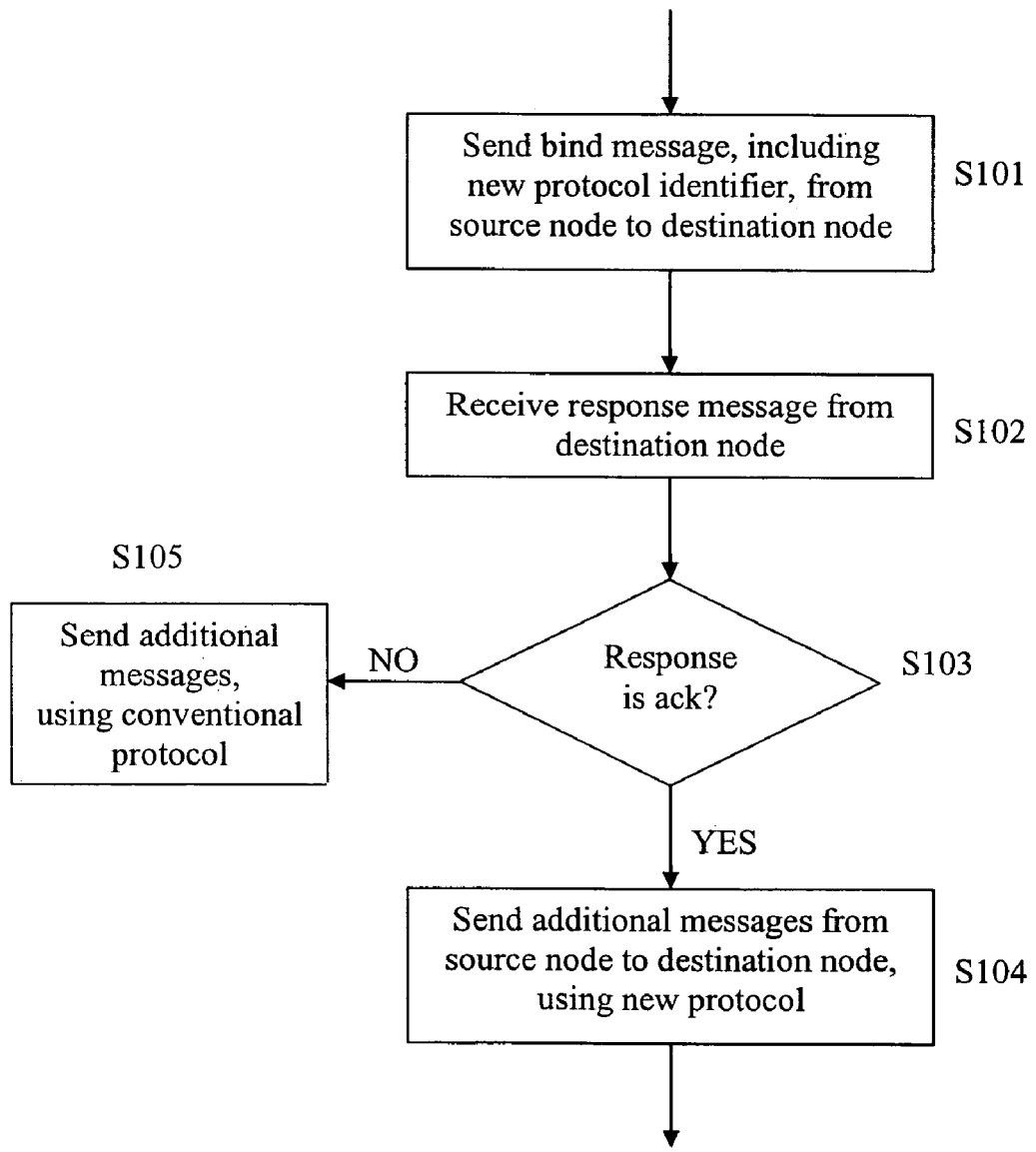

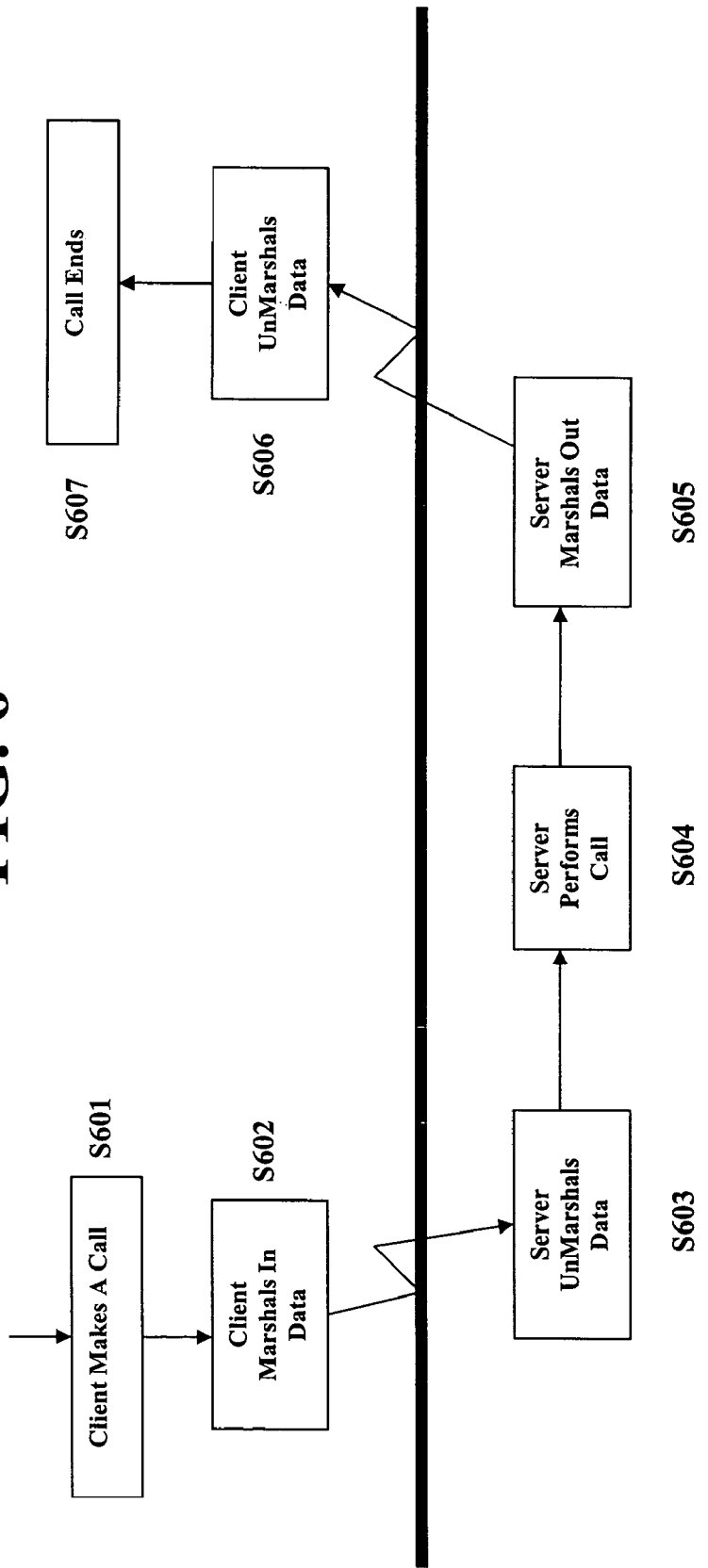

METHOD AND APPARATUS FOR REMOTE MANAGEMENT

CROSS-REFERENCE TO RELATED APPLICATION

This application claims the benefit of U.S. provisional application Ser. No. 60/573,592, filed May 21, 2004 and entitled "METHOD AND APPARATUS FOR REMOTE MANAGEMENT".

TECHNICAL FIELD

The present disclosure relates generally to systems management and, more particularly, to remote management communication and remotely managing a system.

DESCRIPTION OF THE RELATED ART

Proliferating use of the Internet has recently been accompanied by an increase of remote access to, and remote management of, computing resources over the Internet as well as other network environments. Flexible and adaptable communication protocols is desirable in many of these virtual computing systems. The term "system" or "systems" as referred to herein may include individual computers, servers, computing resources, networks, etc.

Remote Procedure Calls (RPC) is a software mechanism that allows client software to execute procedures on other systems and can be used for constructing distributed, client-server based applications. RPC can be used to create connections between procedures that do not exist in the same address space by marshalling the remote calls into a format that can be understood both by the server and by the client. For example, a server may define a service that may be used by a plurality of remote clients.

However, RPC is problematic in some instances which makes it hard for some client software to use. For example, RPC can be rather complicated, making it difficult to port client software to diverse environments. In addition, RPC does not specifically allow a client to request a protocol change while using the same connection. Further, RPC does not support encryption of the transmitted data, and therefore an intruder can more readily exploit system vulnerabilities to gain complete control of a system without being detected. For example, a malicious user can poison the naming system (for example, DNS, WINS, etc.) so that connections to "Server X" actually connect to the malicious user's machine. Thus, when Client Y attempts to establish a connection with "Server X", it actually establishes, transparent to Client Y, a connection to the malicious user's machine, which establishes its own connection to Server X. The malicious user's machine is then able to take requests from Client Y, decrypt them, change them, encrypt them, and send them to Server X. However, Client Y would not know that it is really talking to the malicious user's machine and thinks that it is connected to Server X.

Accordingly, it is desirable to have tools for remote management that overcome these and other problems.

SUMMARY

This application describes methods and apparatuses for remote management communication. According to one embodiment, a method for remote management communication includes sending a bind message including a new protocol identifier from a source node to a destination node, receiving a response message from the destination node, and sending one or more additional messages from the source node to the destination node, using a protocol corresponding to the new protocol identifier, if the response message from the destination node is an acknowledgement message.

An apparatus for remote management communication, according to one embodiment, includes means for sending from a source node a bind message including a new protocol identifier to a destination node, means for receiving a response message from the destination node, and means for sending one or more additional messages from the source node to the destination node, using a protocol corresponding to the new protocol identifier, if the response message from the destination node is an acknowledgement message.

This application also describes methods for managing a remote system. According to one embodiment of the present disclosure, the method includes establishing a connection between a server and a client, sending a first bind packet to the server, receiving the first bind packet from the client, sending a second bind packet to the client in response to the first bind packet, receiving the second bind packet from the server, sending information to the server depending on the second bind packet received by the client, and receiving the information from the client.

A method for managing a remote system, according to another embodiment, includes making a call to a client stub, marshaling in data, wherein the client stub performs the marshaling in of the data, transmitting marshaled data to a server, unmarshaling the transmitted data, wherein the server stub performs the unmarshaling, performing the call after all the data is unmarshaled, marshaling out the data, wherein the server stub performs the marshaling out of the data, transmitting the data to the client, and unmarshaling the transmitted data, wherein the client stub performs the unmarshaling.

This disclosure also describes apparatuses for managing a remote system. According to one embodiment, the apparatus includes means for establishing a connection between a server and a client, means for sending a first bind packet to the server, means for receiving the first bind packet from the client, means for sending a second bind packet to the client in response to the first bind packet, means for receiving the second bind packet from the server, means for sending information to the server depending on the second bind packet received by the client, and means for receiving the information from the client.

An apparatus for managing a remote system, according to another embodiment of the present disclosure, includes means for making a call to a client stub, means for marshaling in data, wherein the client stub performs the marshaling in of the data, means for transmitting marshaled data to a server, means for unmarshaling the transmitted data, wherein the server stub performs the unmarshaling, means for performing the call after all the data is unmarshaled, means for marshaling out the data, wherein the server stub performs the marshaling out of the data, means for transmitting the data to the client, and means for unmarshaling the transmitted data, wherein the client stub performs the unmarshaling.

BRIEF DESCRIPTION OF THE DRAWINGS

The features of the present application can be more readily understood from the following detailed description with reference to the accompanying drawings wherein:

FIG. 2A shows a flow chart illustrating a method, according to an embodiment of the present disclosure, for remote management communication;

FIG. 6 shows a flow diagram illustrating how a remote management protocol request can be processed, according to an embodiment of the present disclosure.

DETAILED DESCRIPTION

This application provides tools (in the form of methodologies, apparatuses, and systems) for managing a remote system and remote management communication. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
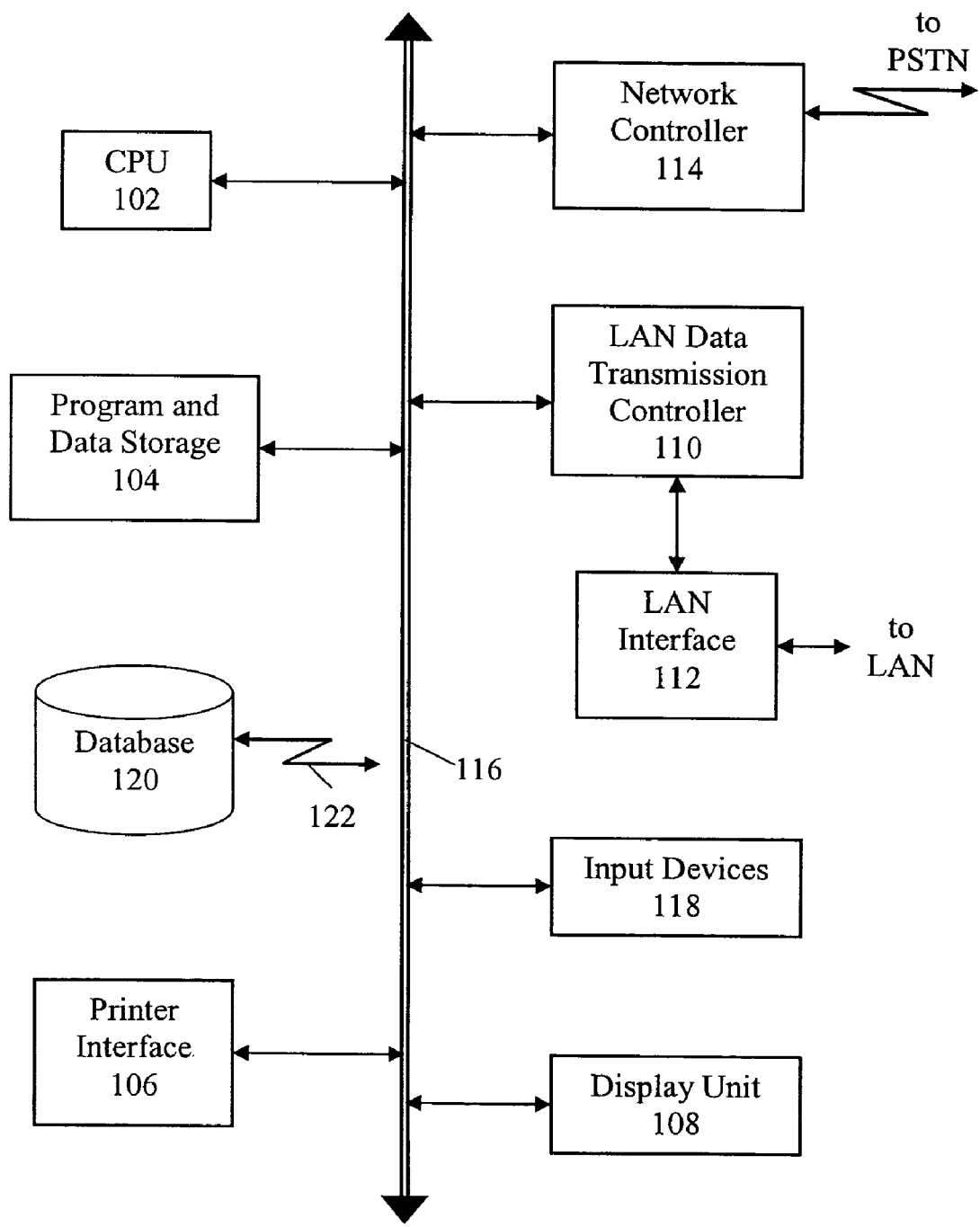
FIG. 1 shows a block diagram of an exemplary computer system capable of implementing the method and system of the present application.

FIG. 1 shows an example of a computer system 100 which may implement the method and apparatus of the present disclosure. The apparatus and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

A method for remote management communication will be explained below with reference to FIG. 2A. A bind message including a new protocol identifier is sent from a source node to a destination node (Step S101). A response message is received by the source node from the destination node (Step S102). If the response message from the destination node is an acknowledgement message (Step S103, YES), the source node sends one or more additional messages to the destination node, using a protocol corresponding to the new protocol identifier (Step S104). If the response message from the destination node is not an acknowledgement message (Step S103, NO), the source node sends the additional messages to the destination node, using a conventional protocol (Step S105).

As an example (discussed in more detail below), Remote Management Protocol (RMP) which can be used to provide a communication mechanism between clients and servers will be discussed below. A functionality of RMP is that it can be used over any connection oriented protocol. For example, RMP can detect whether the port to which it is attempting to connect is governed by Remote Procedure Call (RPC) protocol. If the port is governed by RPC protocol, then RMP aborts any connection attempt to that RPC port. Another functionality of RMP is that it provides added security to client-server connections and prevents malicious users from accessing and interfering with these connections through authentication and encryption.

Figure 2B:
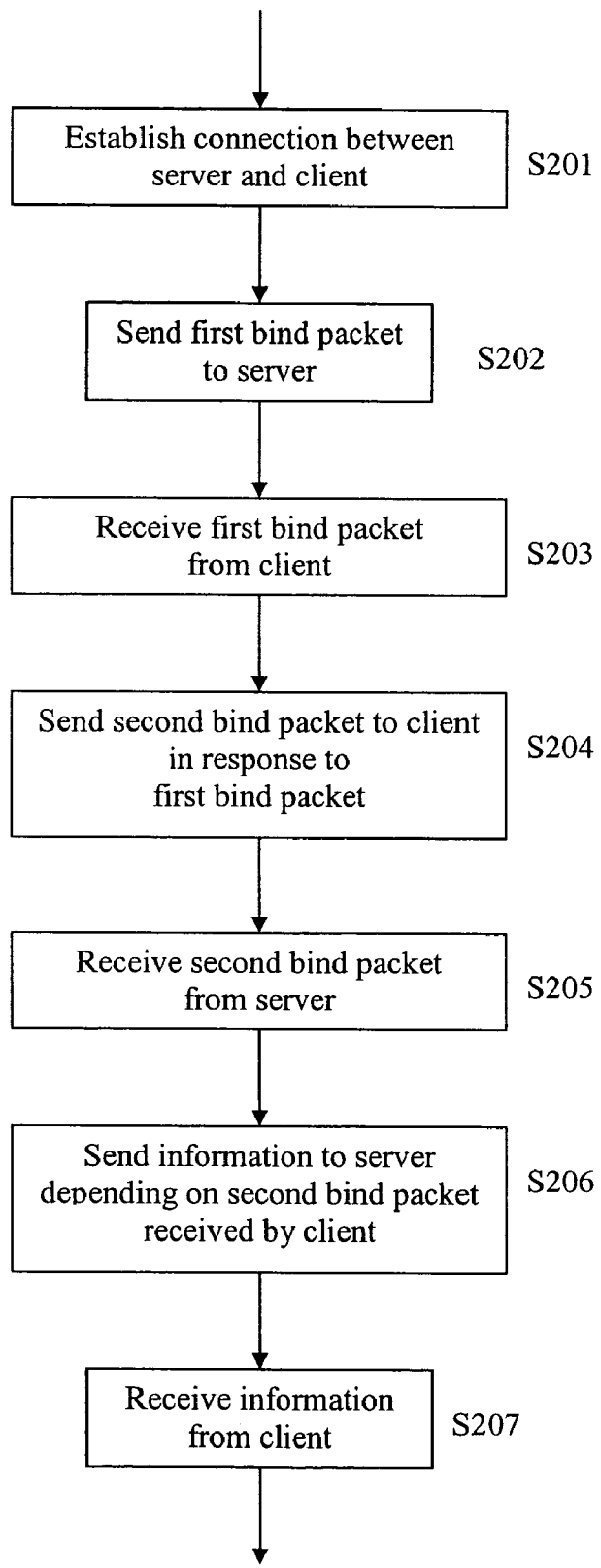
FIG. 2B shows a flow chart illustrating a method, according to an embodiment of the present disclosure, for remote system management.

A method for remote system management, according to an embodiment of the present disclosure, is illustrated in FIG. 2B. A connection is first established between a server and a client (Step S201). The client sends a first bind packet to the server (Step S202). The first bind packet corresponds to a unique identifier that identifies the interface that a RPC connection is going to use. The server receives the first bind packet (Step S203) and then sends a second bind packet to the client in response to the first bind packet (Step S204). If the first bind packet (identifier) is known, then the server sends a bind ack packet to the client. However, if the first bind packet (identifier) is not known, then the server sends a bind nack packet to the client. The client receives the second bind packet (Step S205) and sends information to the server depending on the second bind packet (Step S206). The server then receives the information from the client (Step 207). If the second bind packet is a bind nack packet, then the client knows that it can only use standard RPC to talk to the server. However, if the second bind packet is a bind ack packet, then both the client and server know that they can change to a different protocol.

Figure 3:
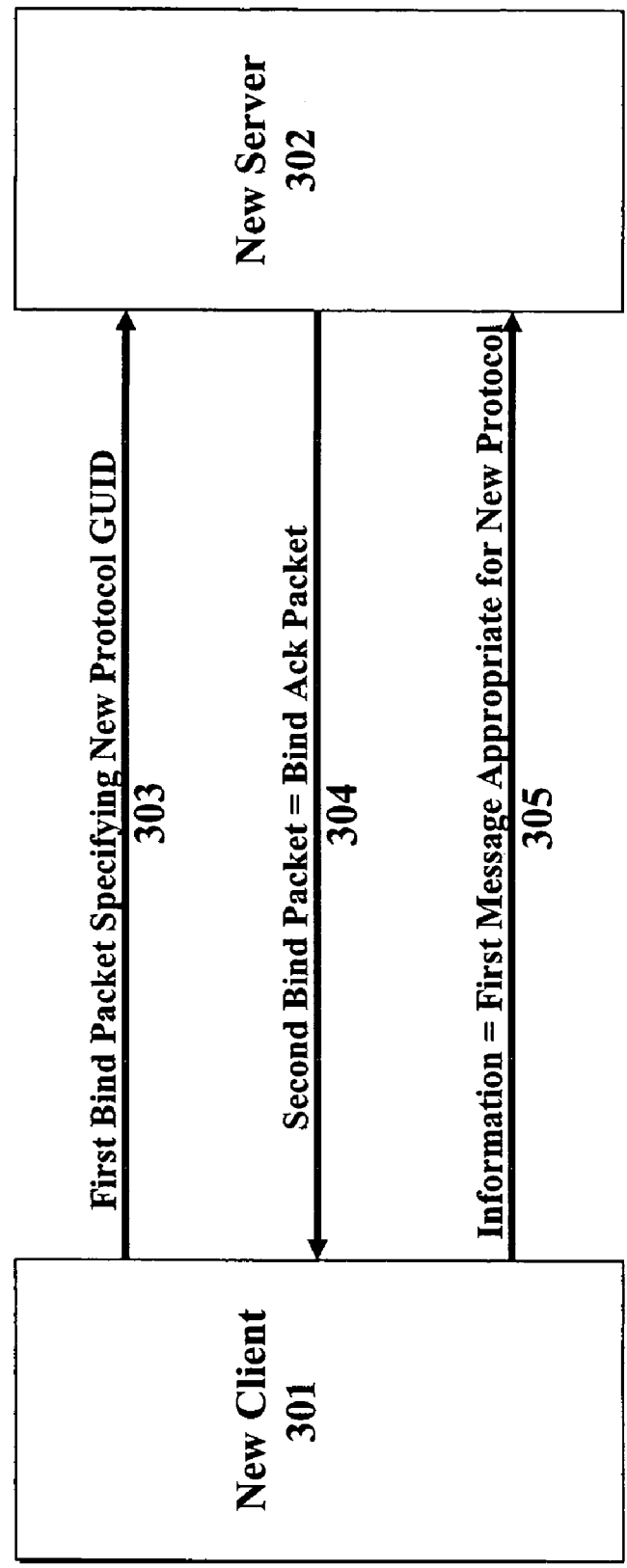
FIG. 3 shows a schematic diagram illustrating the message sequence that is used for a new client and a new server, according to an embodiment of the present disclosure.

The message sequence that results when a new client (that is, one that can use a protocol other than the standard RPC protocol) attempts to connect to a new server (that is, a server that can use a protocol other than the standard RPC protocol) will be described below with reference to FIG. 3. A new client 301 first sends a first bind packet specifying a globally unique identifier (GUID) for a new protocol 303 to a new server 302. The new server 302 recognizes the GUID and responds to the new client 301 by sending a second bind packet, corresponding to a "bind ack" packet 304. The bind ack packet is a packet that alerts a client that it is communicating with a new server. Based on the bind ack packet, the new client 301 knows that it is talking to the new server 302 and sends information corresponding to a first message a new protocol 305.

Figure 4:
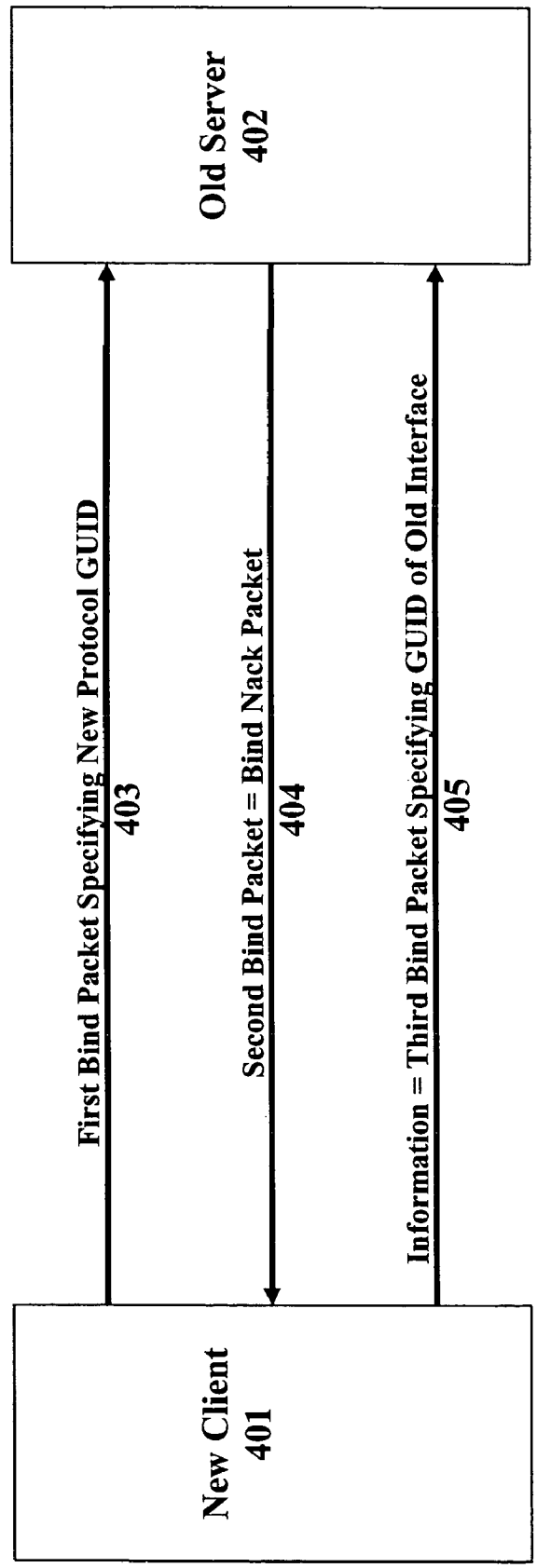
FIG. 4 shows a schematic diagram illustrating the message sequence that is used for a new client and a old server, according to an embodiment of the present disclosure.

The message sequence that results when a new client attempts to connect to an old server (that is, a server that uses the standard RPC protocol) will be described below with reference to FIG. 4. A new client 401 first sends a first bind packet specifying a globally unique identifier (GUID) for a new protocol 403 to an old server 402. The old server 402 does not recognize the GUID and responds to the new client 401 by sending a second bind packet, corresponding to a "bind nack" packet 404. The bind nack packet is a packet that alerts a client that it is communicating with an old server. Based on the bind nack packet, the new client 401 knows that it is talking to the old server 402 and sends information corresponding to a third bind packet specifying the GUID of an old interface 405.

Figure 5:
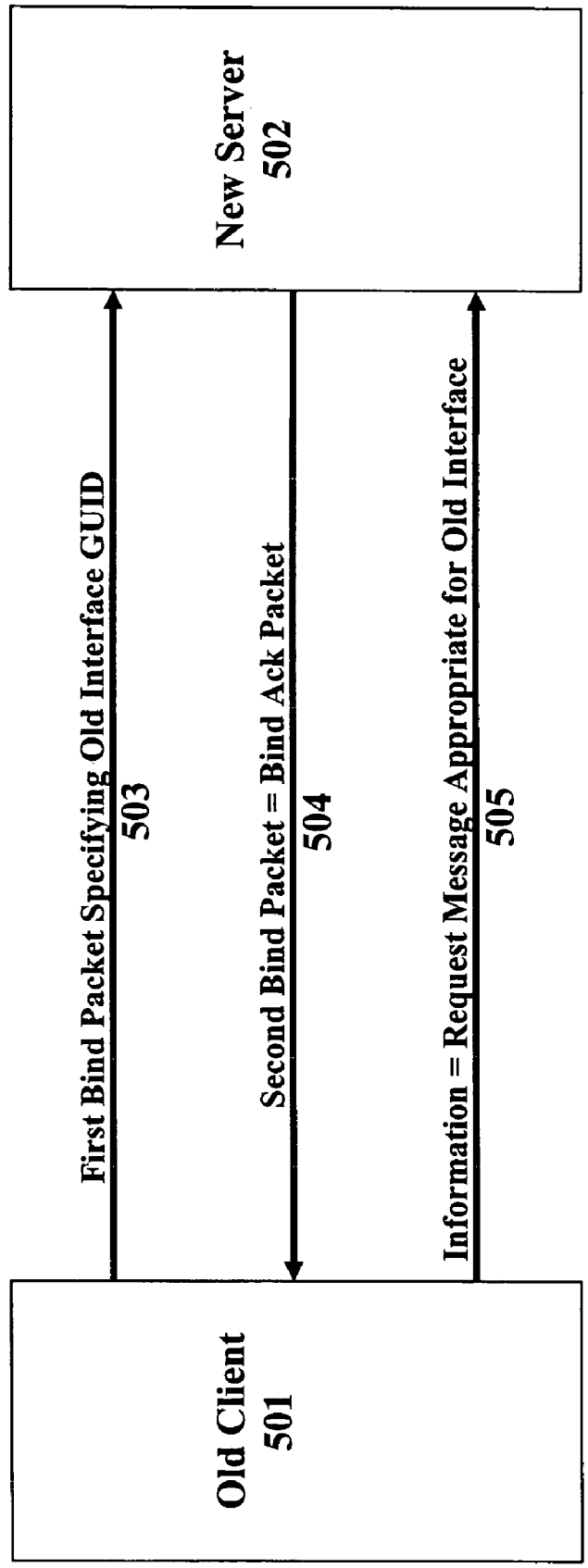
FIG. 5 shows a schematic diagram illustrating the message sequence that is used for a old client and a new server, according to an embodiment of the present disclosure.

The message sequence that results when an old client (that is, one that can use the standard RPC protocol) attempts to connect to a new server, a server that can use a protocol other than the standard RPC protocol, will be described below with reference to FIG. 5. An old client 501 first sends a first bind packet specifying a globally unique identifier (GUID) for an old interface 503 to a new server 502. The new server 502 recognizes the GUID and responds to the old client 501 by sending a second bind packet, corresponding to a "bind ack" packet 504. The bind ack packet is a packet that alerts a client that it is communicating with a new server. Based on the bind ack packet, the old client 501 knows that it is talking to the new server 502; however, sends information corresponding to a request message appropriate for an old interface 505.

Once a bind ack or bind nack packet is received by the client from the server, the connection can be authenticated and a key for the client can be derived. Secure Remote Password (SRP) is a password authentication protocol and can be used to derive the key. A flag can be passed along with the user name to indicate to the server whether the connection is authenticated or not. If the connection is not authenticated, then the password can be a salted hash of the client's host name, which is passed as the user name.

However, because SRP cannot be used for domain users, the client can first send the user ID to be connected and the server can send back a status message indicating whether the user name can be used with SRP. If SRP can be used with the user name, then the password is the server's operating system hash of the user's password. If SRP cannot be used with the user name, then the password becomes a salted hash of the user name.

Once the key is established, if the connection is authenticated, but the user cannot be authenticated using SRP, then the password is encrypted with the key, and sent to the server for authentication.

After the bind ack or bind nack packet is sent by a server, the client sends information back to the server, depending on whether the packet received by the client was a bind ack or a bind nack packet. This information can be in the form of a series of connection packets, where each connection packet is not encrypted. The first connection packet is sent by the client to give the server user information. The following data, where all multi-byte types are expressed in high endian format, can be contained in the first connection packet: "User"—64 bytes (user name to use for the connection); "pointer_size"—1 byte (gives the size of a pointer on a client in bytes); "flags"—1 byte (if the least significant bit (bit 0) is 0, the client can be low endian, if 1, the client can be high endian. If bit 1 is 0, then the connection is not authenticated, otherwise it is an authenticated connection); "encryption"—4 bytes, high endian (a number identifying the best encryption methodology that the client knows; the client support encryption methodologies that are less than, or equal to this number); "port_timeout"—2 bytes, high endian (the number of seconds of inactivity before the client can close the port); "call_timeout"—2 bytes, high endian (the number of seconds before the client can timeout the call. The seconds measured are between when the client completes sending its last packet, and the server sends back its first packet. If the packet is a keep-alive packet, then the number of seconds counted is set back to 0); and "packet_timeout"—2 bytes, high endian (the number of milliseconds the client waits between packets before timing out the call). The second connection packet can be sent from the server to the client, and contains the following data: "srp_allowed"—1 byte (if 0, then SRP for the user is not allowed. If not 0, then SRP for the user is allowed); "encryption"—4 bytes, high endian (the number identifying the encryption methodology that can be used for this connection); "port_timeout"—2 bytes, high endian (the number of seconds of inactivity before the server can close the port); "salt"—32 bytes (random SRP data that is appended to a password before it is hashed); "os_salt"—32 bytes (salt used by the machine to hash the password); "salt_size"—1 byte (the size of the salt); and "packet_timeout"—2 bytes, high endian (number of milliseconds the server waits between packets before timing out the call). A third connection packet can be sent from the client to the server, containing the result of the following methodology: g ^ (random number (128 bytes)) % N. A fourth connection packet can be sent from the server to the client, containing the following data: "index"—4 bytes, high endian (the connection ID to be used in all subsequent packets), and "B" [the result of the following methodology: (v+g^b) % N].

Every client can have at most one thread on each server that it is connected to. For example, a protocol error can be sent to a client in response to a subsequent request from the server while the server is servicing a previous request from that same client.

After a period of inactivity, the ports opened for a connection can be closed by either the client or server (using RMP packets), without contacting the other end of the connection. Closing a port does not close the connection; therefore, if a client wants to make a call to the server after a port is closed, it can open a new port and make the call without having to re-establish an RMP connection. A port cannot be closed by either side if a request is still being serviced.

According to an embodiment of the present disclosure, a client can have a timeout for requests to be serviced. If the server expects to take a long time to service the request, the server can send "keep-alive" packets to the client so that it does not time out. A connection can time out, for example, after a half hour. If a connection has been alive for more than a half hour, the server can refuse to take any new requests using that connection. If a client wishes to make a request, it re-establishes the connection and creates a new key.

During connection, the RMP packets can have a well-defined structure, where all multi-byte types can be represented in a high-endian format. However, once the connection is established, all packets can then be represented in the native format of the client.

All the data, except for the connection number, can be encrypted by using the key derived by SRP. Every RMP packet, except for the connection packets, can have a connection number, SHA hash, a sequence number, and data. The connection number can be used to identify the key to use to decrypt the packet. The SHA hash can be a hash of the sequence number, followed by the data, and might not include the hash bytes themselves. The hash can be used to verify that the decryption proceeded properly, and that nothing was changed while the packet was being transmitted. The sequence number can be used to prevent replay attacks.

Each network packet can be decrypted, and appended to the last network packet to construct the RMP packet. The amount of data sent per network packet is generally the length of the Maximum Transmission Unit ("MTU") between the client and the server, and is a multiple of the block size of the encryption methodology. If extra padding is needed, zeros are appended to the RMP packet to make the last block the minimum size allowed by the encryption methodology. The amount of time between packets that the receiving machine may wait before failing is negotiated during the connection. Each packet is decrypted, and appended to the last packet to in order to construct the RMP packet. The hash in the beginning of the RMP packet exposes any problems and results in a protocol error on the server. If a client receives a packet from the server that it cannot decrypt, the client re-establishes a connection with the server.

Requests can involve the transfer of data from the client to the server and then from the server to the client. Calls from the client to the server can contain the following: "Interface GUID", "Function Number", and "Data". The GUID can identify the interface of the call and the function number can identify the function to call. The data can consist of any arguments to pass to the function. The format of the arguments can be agreed upon between the client and server. If any integrity problems are found (for example, too much, too little, or invalid data), the packet prompts a protocol error packet from the server.

Calls from the server to the client can contain the following: "Data Type", "Return/Error Code", and "Data" (only if a request processed type, and the function passes back data). Three different types of data can be returned by the server in response to a request. The first type can be a "protocol error", which is used to indicate that the previous call was malformed and as a result, nothing on the server was performed. The data returned in this case can be a 32-bit error code. The second type of data type can be a "request processed". The first 32 bits of the data is the return code of the function, followed by the data requested. The data requested can be agreed upon beforehand between the client and the server, or might not exist at all. The third type of data type can be a "keep-alive packet". If the return code is 0, then the server indicates to the client that it is working on the function, but has not yet completed the task. But if the return code is not 0, then the server indicates to the client that it has aborted the call.

The data format can be the same for both packets going to and from the server. It can consist of any one of the following list of types, which can be agreed upon between the client and the server before connection is established: "byte" (8 bits of data, basic unit used to transmit data, and all types are composed of bytes); "string" (a variable number of bytes, where the first 0 byte encountered terminates the string); "word" (16 bits of data in the native format of the client); "Dword" (32 bits of data, in the native format of the client); "Qword" (64 bits of data, in the native format of the client); "Pointer" (variable number of bits, same as the number of bits used to describe a pointer on the client, size of a pointer is given to the server at connection time, and can express NULL by being set to 0, or may be used to alias data); and "union" (a dword followed by a list of types where Dword determines which of the list of types can be used).

FIG. 6 is a flow chart illustrating how an RMP request can be processed, according to an embodiment of the present disclosure. The client first makes a call into a client stub (Step S601), passing arguments to it just like an ordinary function call. The client stub then performs marshaling (that is, a process of packaging, transporting, and unpackaging parameters between a client and a server) of the parameters (Step S602) by making calls into a library, giving a format of the data passed, having the library convert that data, and placing the data into a buffer. After the data is placed into a buffer, the client enters a critical section by setting the sequence number, generating a hash of the data, and encrypting all the information. After the data is encrypted, the buffer is sent in MTU size chunks to a server stub. As the data is received by the server, it is decrypted and placed into a buffer. Once the GUID and function calls are decrypted, the appropriate server stub is called to unmarshal the data (Step S603). The server stub can continue to receive and decrypt data until the end of the data is reached. If a packet timeout occurs between the packets, without completing the unmarshaling of the data specified by the call, a protocol error is sent back to the client and the call is aborted. Once all the data is unmarshaled, the server stub can call the appropriate function to perform the call (Step S604). After the server performs the call, the data that goes back to the client is marshaled (Step S605). After the data is marshaled out, all buffers allocated for the call are freed, and a reply is sent to the client. When the client receives the reply, it exits the critical section protecting the sequence number and unmarshals the transmitted data (Step S606). After the data is unmarshaled, the call ends (Step S607).

Marshaling data can be dictated by an array of structures of the type marshal_format_t. A marshal_format_t structure can contain the following: "is_Pointer" (if TRUE, then the member is a pointer); "type" (a 32-byte buffer containing a zero terminated string giving the name of the structure; if the structure name is not a primitive type, it is registered to the library); "offset" (the offset within the structure where the member resides and is ignored if this is describing a member of a union); "count" (only used if the is_pointer is set to true); and "union_type" (a Dword that specifies what the type identifier of this union member is and is only used if the member is a union). Unmarshaling data can work in the same way as marshaling it. Memory allocated by the unmarshaling code is not freed by the library itself, but can be freed by the client or server stub when need arises.

An associated library can be provided to perform client side operations. The library can be designed to make the rewriting of stub code as simple as possible, allowing for the generation of RMP stubs from Interface Definition Language (IDL) files. The library can also be thread safe. The following functions can be provided in the library and are further described below: "rmp_client_call_server"; "rmp_client_connect"; "rmp_client_create_buffer"; "rmp_client_disconnect"; "rmp_client_is_error_protocol_error"; "rmp_client_marshal_data"; "rmp_client_register_type"; and "rmp_client_unmarshal_data".

The function rmp_client_call_server performs the call to the server using the data stored in the buffer whose handle is passed. This function blocks until either the server returns a response or the server times out. The following parameters can be utilized by rmp_client_call_server: server_name (the name of the server already connected to), buffer (the handle of the buffer where the proper arguments already have been marshaled into the buffer), interface_id (the GUID of the interface to call), and call number (the number of the function within the interface to call).

The function rmp_client_connect performs a connect to the named server and returns error_success if it is successful. If a client is already connected to the server, the function silently succeeds. The following parameters can be utilized by rmp_client_connect: server_name (pointer to the name of the server to connect to (can be protocol specific), user_name (name of the user to connect as, if NULL, the connection established is unauthenticated), password (the password of the user and is only used if the connection is authenticated), protocol (the protocol number to use to connect), and port (the port number to connect to).

The function rmp_client_create_buffer creates a buffer to use for marshaling or unmarshaling the data and returns ERROR_SUCCESS if successful, otherwise, it returns an appropriate error code. The following parameter can be utilized by rmp_client_create_buffer: buffer (a pointer to a HANDLE that is the buffer handle).

The function rmp_client_disconnect can disconnect the client from the server and clean up all resources. This function returns ERROR_SUCCESS if the disconnect was successful, and if it doesn't return this value, then the server can not be disconnected from the client. The following parameter can be utilized by rmp_client_disconnect: server_name (a pointer to the name of the server to connect to, where the name can be protocol specific).

The function rmp_client_is_error_protocol_error can return TRUE if the error code from rmp_client_call_server indicates that the server returned a protocol error. If this function returns TRUE, then the stub cannot attempt to unmarshal the data in the buffer since the client has not received any data to unmarshal. The following parameter can be utilized by rmp_client_is_error_protocol_error: error (the error code from rmp_client_call_server).

The function rmp_client_marshal_data can marshal the data and put it into a specified buffer by taking a buffer described by format, and marshaling that buffer to a buffer whose handle was passed. This function can reset the contents of the buffer, so it marshals all the data used in the call. The following parameters can be utilized by rmp_client_marshal_data: buffer_handle (a handle to the buffer obtained using rmp_client_create_buffer), format (a pointer to an array of marshal_format_t types where each element of the array can describe the contents of data), format_count (the number of elements in a format), and data (the buffer described by format).

The function rmp_client_register_type can register a type and is called during the initialization of a stub. After this function successfully returns, the type name can be used to specify structures to be marshaled. If the type name is already registered, the function can succeed, but does not update the current structure associated with the name. The following parameters can be utilized by rmp_client_register_type: type_name (up to a 32 byte name of the structure that can be used to identify the structure for other marshal_format_t types), type_description (an array of types that can describe the type to be registered; if the union_type field is non-zero in any one element, it is assumed that the types in the array form a union; in this case, union_type fields are unique, or the function fails), and description_count (the number of elements in the type_description).

The function rmp_client_unmarshal_data can unmarshal data received from the server. This function takes the buffer whose handle was passed and transfers the data to the location pointed to by the data. It can be assumed that data has enough storage to hold the unmarshaled data. It can also be assumed that if any members of data are pointers and are not NULL, then those pointers also point to sufficient storage to unmarshal the received data. If any members are pointers and are NULL, then storage is allocated and the pointer is set to that storage. It can be the client's responsibility to free the storage when it is done with it. The following parameters can be utilized by rmp_client_unmarshal_data: buffer_handle (a handle to the buffer obtained using rmp_client_create_buffer), format (a pointer to an array of marshal_format_t types where each element of the array describes the contents of data), format_count (the number of elements in format), and data (the buffer described by format).

An associated library can also be provided to perform server side operations. The library can be designed to make the rewriting of stub code as simple as possible, allowing for the generation of RMP stubs from Interface Definition Language (IDL) files. The library can also be thread safe. The library can spawn the appropriate number of threads to service requests and can set up a socket to listen for requests. The following functions can be provided in the library and are further described below: "rmp_server_free_data"; "rmp_server_marshal_data"; "rmp_register_interface"; "rmp_server_register_type"; "rmp_server_start"; "rmp_server_stop"; and "rmp_server_unmarshal_data".

The function rmp_server_free_data can free data unmarshaled by rmp_server_unmarshal_data. This function can enumerate the pointers described by format and can free all storage for all non-NULL pointers, including embedded pointers. The following parameters can be utilized by rmp_server_free_data: format (a pointer to an array of marshal_format_t types where each element of the array describes the contents of data), format_count (the number of elements in format), and data (the buffer described by format).

The function rmp_server_marshal_data can marshal the data and put it into the buffer specified. This function can take a structure described by format and marshal it to the buffer whose handle was passed. It can also reset the buffer, so all data are marshaled in a single call. The following parameters can be utilized by rmp_server_marshal_data: buffer_handle (the handle to the buffer obtained using rmp_server_create_buffer), format (a pointer to an array of marshal_format_t types where each element of the array describes the contents of data), format_count (the number of elements in format), and data (the buffer described by format).

The function rmp_register_interface can allow the server to process requests for the provided interface. After this function completes, the server can service requests for this interface. The first function pointer can be called if the client gives a call number of 0, the second if the client gives a call number of 1, etc. The functions can return the return value of the function, and the functions are passed a handle to the buffer that is to be used to marshal and unmarshal the function data. The following parameters can be utilized by rmp_register_interface: id (the GUID that identifies the interface), functions (a pointer to an array of function pointers with the prototype Dword funct (HANDLE)), and count (the number of valid function pointers in functions).

The function rmp_server_register_type can register a type and can be called during initialization of a stub. After this function successfully returns, the type name may be used to specify structures to be marshaled. If the type name is already registered, the function can succeed, but does not update the current structure associated with the name. The following parameters can be utilized by rmp_server_register_type: type_name (up to 32-byte name of a structure that can be used to identify the structure later in other marshal_format_t types), type_description (an array of types that describe the type to be registered; if the union_type field is non-zero in any one element, it can be assumed that the types in the array form a union; in this case, the union_type fields are unique or the function fails), and description_count (the number of elements in type_description).

The function rmp_server_start can start an RMP server (starts the threads) and get it to listen for requests. The following parameters can be utilized by rmp_server_start: protocol (the protocol to listen to), port (can specify the port to listen to and the protocol is determined by the library), start_threads (the number of threads to service requests that are created before the function returns), max_threads (the maximum number of threads the server may create to service requests), and server_handle (if the function is successful, this can contain a handle to the server).

The function rmp_server_stop can stop an RMP server and release all resources. The following parameter can be utilized by rmp_server_stop: server_handle (the handle of the server to stop).

The function rmp_server_unmarshal_data can unmarshal the data received from the client by taking the buffer whose handle was passed and transferring the data to the location pointed to by data. It can be assumed that data has enough storage to hold the unmarshaled data. It can also be assumed that if any members of data are pointers and are not NULL, then they point to sufficient storage to unmarshal the received data. If any members are pointers and are NULL, then storage is allocated and the pointer is set to that storage. It can be the client's responsibility to free that storage when it is done with it. The following parameters can be utilized by rmp_server_unmarshal_data: buffer_handle (handle to the buffer obtained using rmp_server_create_buffer), format (a pointer to an array of marshal_format_t types where each element of the array describes the contents of data), format_count (the number of elements in format), and data (the buffer described by format).

The above specific embodiments are illustrative, and many additional modifications and variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

Additional variations may be apparent to one of ordinary skill in the art from reading U.S. provisional application Ser. No. 60/573,592, filed May 21, 2004 and entitled "METHOD AND APPARATUS FOR REMOTE MANAGEMENT", the entire contents of which are incorporated herein by reference.

What is claimed is:

1. A method for managing a remote system, comprising:
   establishing a connection between a server and a client;
   sending a first bind packet to the server, the first bind packet specifying a globally unique identifier (GUID) for a protocol other than standard remote procedure call protocol;
   receiving a second bind packet from the server in response to the first bind packet, the second bind packet indicating whether the server accepts the protocol specified by the first bind packet; and
   sending information for remote management to the server using the same connection session, the sending using the protocol specified by the first bind packet if the second bind packet indicates that the server accepts the protocol and using a different protocol if the second packet indicates that the server does not accept the protocol.

2. The method of claim 1, wherein the first bind packet comprises a globally unique identifier (GUID) that identifies the interface that the connection is going to use.

3. The method of claim 1, wherein a client that can use a protocol other than standard remote procedure call sends the first bind packet to the server.

4. The method of claim 1, wherein the client is a client that can use a protocol other than standard remote procedure call (RPC).

5. The method of claim 1, wherein the server sends a second bind packet corresponding to a bind nack packet.

6. The method of claim 5, wherein the bind nack packet alerts the client that it is communicating with a server that uses the standard remote procedure call protocol.

7. The method of claim 1, wherein:
   the server is a server that can use a protocol other than standard remote procedure call; and
   the server sends a second bind packet corresponding to a bind ack packet.

8. The method of claim 7, wherein the bind ack packet alerts the client that it is communicating with a server that can use a protocol other than standard remote procedure call.

9. The method of claim 1, wherein the information sent to the server by a client is a series of connection packets.

10. The method of claim 9, wherein the series of connection packets are not encrypted.

11. The method of claim 1, wherein:
    the client is a client that can use a protocol other than standard remote procedure call; and
    the information sent to the server by the client is a first message appropriate for a new protocol, if the second bind packet is a bind ack packet.

12. The method of claim 1, wherein the information sent to the server by the client is a request message appropriate for a standard remote call procedure protocol interface, if the second bind packet is a bind nack packet.

13. The method of claim 1, wherein the information sent to the server by the client is a third bind packet specifying the globally unique identifier (GUID) of a standard remote call procedure protocol interface, if the second bind packet is a bind nack packet.

14. The method of claim 1, wherein a connection is authenticated and a key is derived for a client when the second bind packet is received by the client from the server.

15. The method of claim 14, wherein the key is derived using the Secure Remote Password (SRP) methodology.

16. Software embodied on a non-transitory computer readable storage medium, the software comprising computer code such that when executed is operable to:
    establish a connection between a server and a client;
    send a first bind packet to a server, the first bind packet specifying a globally unique identifier (GUID) for a protocol other than standard remote procedure call protocol;
    receive a second bind packet from the server, the second bind packet indicating whether the server accepts the protocol specified by the first bind packet; and
    send information for remote management to the server using the same connection session, the sending using the protocol specified by the first bind packet if the second bind packet indicates that the server accepts the protocol and using a different protocol if the second bind packet indicates that the server does not accept the protocol.

17. The computer readable storage medium of claim 16, wherein code operable to send information to the server depending on the second bind packet received, comprises code operable to send a request message appropriate for a standard remote call procedure protocol interface, if the second bind packet is a bind nack packet.

18. The computer readable storage medium of claim 16, wherein the code is further operable to send a third bind packet specifying the globally unique identifier (GUID) of a standard remote call procedure protocol interface if the second bind packet is a bind nack packet.

19. The computer readable storage medium of claim 16, wherein code operable to send a first bind packet to a server comprises code operable to send a request message appropriate for an interface that is not a standard remote call procedure protocol interface, if the second bind packet is a bind ack packet.

20. The computer readable storage medium of claim 16, wherein code operable to send a first bind packet to a server comprises code operable to send a bind packet appropriate for an interface that is not a standard remote call procedure protocol interface.

21. An apparatus for managing a remote system, comprising:
    means for establishing a connection between a server and a client;

means for sending a first bind packet to the server, the first bind packet specifying a globally unique identifier (GUID) for a protocol other than standard remote procedure call protocol;

means for receiving a second bind packet from the server in response to the first bind packet, the second bind packet indicating whether the server accepts the protocol specified by the first bind packet; and means for sending information for remote management to the server using the same connection session, the sending using the protocol specified by the first bind packet if the second bind packet indicates that the server accepts the protocol and using a different protocol if the second bind packet indicates that the server does not accept the protocol.

* * * * *